United States Patent Office 3,249,844
Patented May 3, 1966

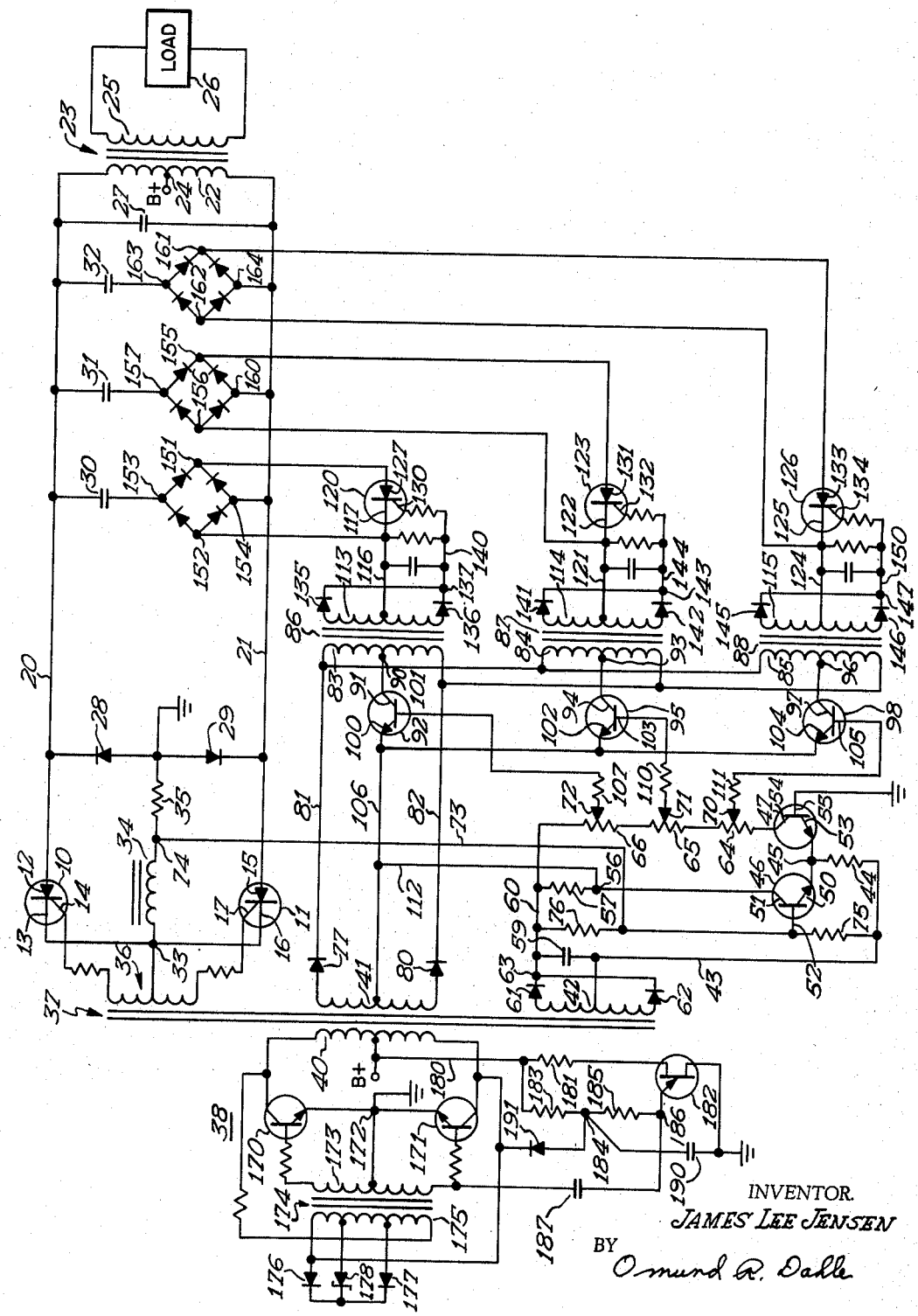

3,249,844
SEMICONDUCTOR APPARATUS
James Lee Jensen, St. Louis Park, Minn., assignor to Honeywell Inc., a corporation of Delaware
Filed Aug. 23, 1962, Ser. No. 218,905
2 Claims. (Cl. 321—44)

This invention relates generally to improvements in a silicon controlled rectifier direct current to alternate current inverter circuit. The invention is more particularly related to such inverter circuits in which it is desired to change the commutating capacitor size as a function of the load current.

It has been determined in silicon controlled rectifier inverters that it is possible to design for an optimum commutating capacitor value at a particular load but that as the load changes, the capacitor value chosen is no longer optimum. In numerous circuits for which SCR inverters are used, the load current may vary from zero to the maximum current for which the SCR's are designed and under these widely varying load conditions no single commutating capacitor will insure that the SCR inverter will continue to function.

It is therefore an object of this invention to provide an improved SCR D.C. to A.C. inverter circuit to accommodate widely varying load currents.

It is a more specific object of this invention to provide an improved SCR D.C. to A.C. inverter circuit in which the commutating capacity is varied as a function of load current determined from the inverter.

It is a still more specific object of this invention to provide an improved SCR inverter in which the load current is sensed to control electronic switching valves which connect into the circuit additional commutating capacitors as the load current demand increases.

These and other objects of this invention will become more apparent upon a consideration of the attached specification, claims and drawing of which:

The single figure of the drawing is a schematic representation of an embodiment of the invention.

Referring now to the drawing, there is disclosed a pair of semiconductor switches 10 and 11, here disclosed as silicon controlled rectifiers. SCR 10 has a pair of power controlling electrodes comprising an anode 12 and a cathode 13, and a control or gate electrode 14, and similarly SCR 11 has an anode 15, a cathode 16, and a gate electrode 17. The anodes 12 and 15 are connected by a pair of conductors 20 and 21 to the extremities of a load circuit here shown as a primary winding 22 of an output transformer 23. Primary winding 22 has a center tap 24 which is connected to a suitable source of D.C. potential. The output transformer 23 also includes a secondary winding 25 which is connected to suitable load means 26. A rectifying diode 28 is connected from ground to conductor 20 and a diode 29 is connected from ground to conductor 21.

Four commutating capacitors 27, 30, 31 and 32 are connected in parallel with the primary winding 22 of transformer 23. The first of these commutating capacitors 27 is directly connected in parallel with the primary winding. Each of the other commutating capacitors is selectively connected in parallel with commutating capacitor 27 by switching means as a function of the load current, as will be described in detail below.

Referring again to the SCR's 10 and 11, the cathode electrodes are directly connected together at a junction 33 and through a choke coil 34 and a current sensing means, here shown as a resistor 35 to ground potential. A current transformer may be used instead of the resistor, if desired, to minimize losses and obtain isolation. Junction 33 is also connected to the center tap of a secondary winding 36 of a transformer 37. Transformer 37 also includes a primary winding 40 which is energized from a suitable source of alternating current 38, here shown as a semiconductor oscillator of the general type disclosed in my Patent No. 2,997,664. Transformer 37 also includes further center tapped secondary windings 41 and 42. The specific embodiment of the SCR inverter disclosed is of the push pull type with two SCR's 10 and 11, however, the invention is not intended to be limited to a push pull type. The load circuit is shown as being connected through an output transformer 23 to the inverter but the invention is not intended to be limited to an inverter requiring an output transformer.

Oscillator 38 comprises a pair of transistors 170 and 171 each having emitter, collector, and base electrodes. The collector electrodes of the transistors are connected to opposite extremities of primary winding 40 of transformer 37. The emitter electrodes are directly tied together at a junction 172 and are connected to ground. The base electrodes of the two transistors are connected through current limiting resistors to the opposite extremities of a secondary winding 173 of the feedback transformer 174. A feedback transformer 174 also includes a primary winding 175 which has its extremities connected to the collector electrodes of transistors 170 and 171. A pair of rectifying diodes 176 and 177 together with a Zener diode 178 are connected across the feedback primary winding 175 to limit the feedback voltage and thereby provide frequency stabilization of the inverter.

A unijunction transistor starting circuit for the inverter may be traced from the B+ terminal through a conductor 180 and a resistor 181 to a first base electrode of unijunction transistor 182. The second base electrode of the unijunction transistor is connected to ground. The conductor 180 is also connected through a resistor 183, a junction 184, a resistor 185, a junction 186 and a capacitor 187 to the lower extremity of secondary winding 173 of feedback transformer 174. The junction 186 is connected to the emitter electrode of the unijunction transistor. The junction 184 is connected through a capacitor 190 to ground potential, and junction 184 is further connected by a rectifying diode 191 to the collector electrode of transistor 171. Upon application of power to the system, a current flows through conductor 180, resistors 183 and 185, and capacitor 187 thus providing a positive starting pulse to the base electrode of transistor 171. Simultaneously, the capacitor 190 begins to charge so that after a period of time determined by the RC constants of the circuit, the unijunction transistor fires discharging the capacitors and allowing the initiation of another starting pulse to the inverter. When the inverter 38 is operating, the relaxation oscillator comprising unijunction 182 is maintained cut off. During the half-cycle of operation when transistor 171 is conductive, the junction 184 is maintained at a potential approaching ground potential by means of the diode 191 and the negligible voltage drop across the collector to emitter of transistor 171. The capacitor 190 is thus maintained at a low enough potential so that the unijunction transistor does not fire as long as the inverter 38 is operative.

The center tap of winding 42 is connected by a conductor 43, a common emitter resistor 44 and a junction 45 to the emitter electrode of a pair of transistors 46 and 47. Transistor 46 has an emitter electrode 50, a collector electrode 51 and a base electrode 52 and transistor 47 has an emitter electrode 53, a collector electrode 54 and a base electrode 55. These two transistors 46 and 47 form a conventional differential amplifier. Collector electrode 51 is connected by a junction 56 and a resistor 57 to a conductor 60. The upper and lower extremities of secondary winding 42 are connected through a pair of rectifying diodes 61 and 62, respectively, to a junction 63 on the conductor 60. The collector electrode 54 of transistor 47 is connected through potentiometers 64, 65 and 66 to the conductor 60. These potentiometers are shown as being in series with one another, however, they may be arranged in a parallel configuration if desired. Potentiometers 64, 65 and 66 have in connection therewith, respectively, wiper contacts 70, 71 and 72. The base electrode 55 of transistor 47 is connected to ground. The base electrode 52 of transistor 46 is connected by a conductor 73 to a junction 74 between choke 34 and resistor 35. A further biasing network is connected to base electrode 52 including a resistor 75 connecting the base to the conductor 43 and a resistor 76 connecting the base to the conductor 60.

The upper and lower extremities of secondary winding 41 are connected through a pair of rectifying diodes 77 and 80 and a pair of conductors 81 and 82, respectively, to the primary windings 83, 84 and 85 of three transformers 86, 87 and 88. The primary windings 83, 84 and 85 are connected in parallel. A center tap 90 of winding 83 is connected to the collector electrode 91 of a transistor 92; a center tap 93 of winding 84 is directly connected to a collector electrode 94 of a transistor 95; and a center tap 96 of winding 85 is directly connected to a collector electrode 97 of a transistor 98. Transistor 92 also includes an emitter electrode 100 and a base electrode 101, transistor 95 also include an emitter electrode 102 and a base electrode 103 and transistor 98 also includes an emitter electrode 104 and a base electrode 105. The emitter electrode 100, 102 and 104 are connected in parallel and are connected by a conductor 106 to the center tap of secondary winding 41. Base electrode 101 is connected by a resistor 107 to the wiper contact 72 of potentiometer 66, base electrode 103 is connected by a resistor 110 to the wiper 71 of potentiometer 65, and base electrode 105 is connected by a resistor 111 to the wiper 70 of potentiometer 64. A conductor 112 directly connects together the conductor 106 to the junction 56.

Transformers 86, 87 and 88 have center tapped secondary windings 113, 114 and 115, respectively. The center tap of winding 113 is connected by a conductor 116 to the cathode 117 of an SCR 120, the center tap of winding 114 is connected by a conductor 121 to a cathode electrode 122 of an SCR 123 and the center tap of winding 115 is connected by a conductor 124 to a cathode electrode 125 of an SCR 126. SCR 120 also includes an anode 127 and a gate electrode 130, SCR 123 also includes an anode 131 and a gate electrode 132, and SCR 126 also includes an anode 133 and a gate electrode 134.

A pair of rectifying diodes 135 and 136 connect the extremities of winding 113 to a common junction 137. Junction 137 is connected by a conductor 140 and a resistor to the gate electrode 130. A pair of rectifying diodes 141 and 142 connect the extremities of winding 114 to a common junction 143, the junction 143 being connected by a conductor 144 and a resistor to the gate 132. A pair of rectifying diodes 145 and 146 connect the extremities of winding 115 to a common junction 147, the junction 147 being connected by conductor 150 and a resistor to the gate 134. A capacitor and resistor, in parallel, are connected between the cathode and gate electrode of each of the SCR's 120, 123 and 126. These resistor and capacitor combinations present a relatively long time constant so that a gate signal is retained for a predetermined number of cycles. The entire network of differential amplifier transistors 46 and 47 and transistors 92, 95 and 98 together with the associated components may be replaced by Schmitt trigger circuits or other suitable sensing means for driving the SCR's 120, 123 and 126.

The anode and cathode of SCR 120 are directly connected to diagonally opposite terminals 151 and 152 of a conventional bridge rectifier circuit. The opposite diagonals 153 and 154 of the bridge rectifier connect the commutating capacitor 30 betwen conductors 20 and 21. The anode and cathode of SCR 123 are connected to diagonally opposite terminals 155 and 156 of a full wave bridge rectifier, the other diagonals 157 and 160 connecting the commutating capacitor 31 between conductors 20 and 21. Similarly, the anode and cathode of SCR 126 are connected to terminals 161 and 162 of a full wave bridge rectifier, the opposite diagonals 163 and 164 of which connect the commutating capacitor 32 between conductors 20 and 21.

In considering the operation of my invention, the alternating output of the transistor oscillator 38 is coupled through transformer 37 and secondary winding 36 to alternately gate in to conduction the SCR's 10 and 11. Let us assume at this point of the operation that the load current is relatively light or negligible. Let us now assume that the SCR 10 is conductive and SCR 11 is cut off. A current path may be traced from the positive supply conductor through tap 24, the upper portion of primary winding 22 of output transformer 23, through the conductor 20, through the SCR 10 anode to cathode to the junction 33, through the choke 34, and the current sensing resistor 35 to ground.

During this period of time, the commutating capacitor 27 charges to a value which is approximately equal to twice the supply potential, due to the induced voltage on the lower portion of primary winding 22. Upon a reversal in polarity of the A.C. supply at input transformer 37, the SCR 11 is gated to conduction and the charge on commutating capacitor 27 extinguishes SCR 10 in the conventional manner. A current path may now be traced from the positive supply potential through the lower portion of primary winding 22, through the conductor 21, the SCR 11 to the junction 33, and through choke 34 and current sensing resistor 35 to ground. The commutating capacitor 27 now charges in the opposite polarity to that previously described. The voltage induced on the secondary winding of output transformer is now of the opposite polarity thus providing an alternating output to the load device. The A.C. source 38 thus continues to gate SCR's 10 and 11 to conduction alternately at the A.C. frequency.

Turning now to a consideration of the differential amplifier comprising transistors 46 and 47, it will be seen that base 55 is connected directly to ground and that base 52 is connected between conductor 73 and current sensing resistor 35 to ground. Thus under the conditions of a light load, there is very little potential drop across the resistor 35 and the transistors 46 and 47 conduct substantially alike. The base 52 will be biased slightly more positive by the voltage drop existing across resistor 35. A current path for the differential amplifier may be traced from the positive junction 63 and conductor 60, through resistor 57 and transistor 46 to junction 45. A parallel path from conductor 60 may be traced through potentiometers 66, 65, 64 and transistor 57 to the junction 45. The currents then flow through the common emitter feedback resistor 44 and conductor 43 to the center tap of winding 42. The power supply comprising winding 42, rectifiers 61 and 62, and filter capacitor 59 tends to float at a voltage determined by the voltage divider comprising resistors 76 and 75.

Under the operating conditions of a relatively light load current just described, the commutating capacitors 30, 31 and 32 have played no part in the operation of the inverter. Let us now assume the load current demand increases so that an increasing voltage drop appears across the current sensing resistor 35. As has been previously described, the junction 74 is connected to the base electrode 52 of transistor 50, and an increasing load current causes a rising potential to the base electrode 52 such that the conduction of transistor 50 tends to increase, the transistor 47 thus being caused to conduct less current, as is conventional in differential amplifiers. When the current through transistor 47 is decreased, the potential at wipers 70, 71 and 72 changes so that the potential to base electrodes 105, 103 and 101 is varied with respect to their paralleled emitter electrodes 104, 102 and 100 which are directly connected to the collector electrode 51 of transistor 46. Thus, as the differential amplifier comprising transistors 46 and 47 begins to become unbalanced, a bias voltage appears between the base 101 and emitter 100 of transistor 92 sufficient to render it conductive. When transistor 92 conducts, a current flows in the primary winding 83 of transformer 86 providing a potential in secondary winding 113 which is rectified by diodes 135 and 136 and applied as a gate voltage to turn on SCR 120. The conduction of SCR 120 provides, in effect, a short circuit between terminals 151 and 152 of the bridge rectifier so that commutating capacitor 30 is effectively placed in parallel with commutating capacitor 27 from conductor 20 to conductor 21. Thus a first degree of increase in the effective size of the commutating capacitor has been effected as the load current begins to increase.

Further increases in the current to the load causes an increasing voltage drop across the current sensing resistor 35 which further unbalances the differential amplifier comprising transistors 46 and 47. Under these conditions, in addition to the transistor 92 being rendered conductive, transistor 95 also becomes conductive and also provides a gating signal to the SCR 123 in the same manner as described above for SCR 120. SCR 123 then becomes conductive in addition to SCR 120 and effectively connects commutating capacitor 31 in parallel with commutating capacitors 27 and 30. Further increase in the load current similarly renders transistor 98 and SCR 126 conductive to include commutating capacitor 32 in circuit with the other three commutating capacitors. Thus the capacity of the commutating capacitor is maintained at an optimum value from no load to full load.

The SCR's 126, 123 and 120 extinguish sequentially as the load current decreases.

The diodes 28 and 29 are effective to allow currents of a transient nature to continue to flow to the load circuit after the SCR has been shut off. These diodes are of importance where the load is of a reactive nature resulting in a lagging power factor.

Many changes and modifications of this invention will undoubtedly occur to those who are skilled in the art and I therefore wish it to be understood that I intend to be limited by the scope of the appended claims and not by the specific embodiment of my invention which is disclosed herein for the purposes of illustration only.

I claim as my invention:

1. Controlled rectifier inverter means comprising:
   first and second controlled rectifiers, each having a plurality of electrodes including a control electrode, a power input electrode and a power output electrode;
   output transformer means having primary and secondary winding means;
   a source of direct current potential having a first and a second terminal;
   connection means including said primary winding means for connecting the first terminal of said source to said power input electrodes and the second terminal of said source to said power output electrodes;
   a plurality of switching means;
   a plurality of commutating capacitor means, each capacitor means being associated with one of said switching means and being connected across said transformer means by said switching means;
   load current responsive means connected in a sensing relation to said connection means;
   amplifier means having an input connected to said load current responsive means and having an output; and
   means connecting said amplifier means to said switching means so that upon response of said current responsive means said commutating capacitor means are sequentially switched into the circuit as the load current increases and are sequentially removed from the circuit as the load current decreases.

2. Controlled rectifier inverter means comprising:
   first and second controlled rectifiers, each having a plurality of electrodes including a control electrode, a power output electrode and a power input electrode;
   output transformer means having primary and secondary windings means;
   a source of direct current potential having a first and a second terminal;
   connection means including said transformer means primary winding means for connecting the first terminal of said source to said power input electrodes and the second terminal of said source to said power output electrodes;
   a plurality of voltage responsive switching means;
   a plurality of commutating capacitor means, each capacitor means being associated with one of said switching means and being connected across said transformer means by said switching means;
   load current responsive means connected in a sensing relation to said connection means;
   voltage generating means connected to said load current responsive means and adapted to provide a plurality of output voltages of unequal magnitude but all of which are functions of load current; and
   means connecting said voltage generating means to said switching means so that upon response of said current responsive means said commutating capacitor means are sequentially switched into the circuit as the load increases and are sequentially removed from the circuit as the load decreases.

References Cited by the Examiner

General Electric, "Controlled Rectifier Manual," 1st edition, copyright March 21, 1960, pages 72, 127 and 126–130 relied on.

JOHN F. COUCH, *Primary Examiner.*

LLOYD McCOLLUM, *Examiner.*

J. M. THOMSON, *Assistant Examiner.*